US011465040B2

(12) United States Patent
Hall (10) Patent No.: US 11,465,040 B2
(45) Date of Patent: Oct. 11, 2022

(54) SYSTEM AND METHOD FOR PLAYING VIDEO GAMES ON TOUCHSCREEN-BASED DEVICES

(71) Applicant: Activision Publishing, Inc., Santa Monica, CA (US)

(72) Inventor: Gordon Hall, Doncaster (GB)

(73) Assignee: Activision Publishing, Inc., Santa Monica, CA (US)

( * ) Notice: Subject to any disclaimer, the term of this patent is extended or adjusted under 35 U.S.C. 154(b) by 718 days.

(21) Appl. No.: 14/103,774

(22) Filed: Dec. 11, 2013

(65) Prior Publication Data

US 2015/0157940 A1 Jun. 11, 2015

(51) Int. Cl.
| | |
|---|---|
| *A63F 13/2145* | (2014.01) |
| *A63F 13/533* | (2014.01) |
| *A63F 13/5372* | (2014.01) |
| *A63F 13/837* | (2014.01) |

(52) U.S. Cl.
CPC ........ *A63F 13/2145* (2014.09); *A63F 13/533* (2014.09); *A63F 13/5372* (2014.09); *A63F 13/837* (2014.09)

(58) Field of Classification Search
CPC .... A63F 13/837; A63F 13/53; A63F 13/2145; A63F 13/5372; A63F 13/533
See application file for complete search history.

(56) References Cited

U.S. PATENT DOCUMENTS

| | | | | |
|---|---|---|---|---|
| 6,217,446 | B1* | 4/2001 | Sanbongi | A63F 13/10 |
| | | | | 345/419 |
| 6,320,582 | B1* | 11/2001 | Yamamoto | A63F 13/10 |
| | | | | 345/427 |
| 6,544,123 | B1* | 4/2003 | Tanaka | A63F 13/10 |
| | | | | 463/1 |
| 7,470,195 | B1* | 12/2008 | Baldwin, III | A63F 13/10 |
| | | | | 463/33 |
| 8,210,943 | B1* | 7/2012 | Woodard | A63F 13/10 |
| | | | | 463/1 |

(Continued)

OTHER PUBLICATIONS

Allakhazam, Threat (WoW), archived 2011 (Year: 2011).*

(Continued)

*Primary Examiner* — Thomas H Henry
(74) *Attorney, Agent, or Firm* — Klein, O'Neill & Singh, LLP (57) ABSTRACT

The present invention relates to systems and methods for controlling a weapons-related video game on a touchscreen-based device. Aspects of the invention simplify the act of aiming at a target on a touchscreen-based device by: presenting a virtual environment from a first viewpoint and a user interface to a player, the user interface comprising at least one graphical user input element, the virtual environment including a plurality of targets, at least some of which has assigned priorities; assigning a priority to at least one of the targets; determining a highest-priority target out of the at least one of the targets that have been assigned a priority; receiving an indication that the at least one graphical user input element has been selected by a user; and, in response, determining a second viewpoint for viewing the virtual environment that is different from the first viewpoint for viewing the virtual environment, relative to the highest-priority target.

9 Claims, 6 Drawing Sheets

(56) References Cited

U.S. PATENT DOCUMENTS

| | | | |
|---|---|---|---|
| 8,342,926 B2* | 1/2013 | Garvin | A63F 13/10 463/38 |
| 8,777,708 B2* | 7/2014 | Langridge | A63F 13/837 463/5 |
| 8,827,804 B2* | 9/2014 | Woodard | A63F 13/69 463/1 |
| 8,834,245 B2* | 9/2014 | Haigh-Hutchinson | A63F 13/10 463/2 |
| 9,327,191 B2* | 5/2016 | Miyamoto | A63F 13/10 |
| 2002/0103031 A1* | 8/2002 | Neveu | A63F 13/06 463/49 |
| 2002/0132665 A1* | 9/2002 | Kato | A63F 13/10 463/30 |
| 2004/0110560 A1* | 6/2004 | Aonuma | A63F 13/10 463/32 |
| 2006/0084509 A1* | 4/2006 | Novak | A63F 13/12 463/49 |
| 2006/0199626 A1* | 9/2006 | Ortiz | A63F 13/10 463/2 |
| 2007/0270215 A1* | 11/2007 | Miyamoto | A63F 13/10 463/32 |
| 2008/0096622 A1* | 4/2008 | Terada | A63F 13/10 463/2 |
| 2008/0188302 A1* | 8/2008 | Haga | A63F 13/10 463/31 |
| 2008/0227543 A1* | 9/2008 | Kawase | A63F 13/10 463/31 |
| 2009/0011808 A1* | 1/2009 | Ikematsu | A63F 13/426 463/2 |
| 2009/0023485 A1* | 1/2009 | Ishihata | A63F 13/10 463/2 |
| 2009/0181736 A1* | 7/2009 | Haigh-Hutchinson | A63F 13/10 463/2 |
| 2009/0247250 A1* | 10/2009 | Kato | A63F 13/10 463/2 |
| 2009/0325660 A1* | 12/2009 | Langridge | A63F 13/10 463/2 |
| 2010/0009733 A1* | 1/2010 | Garvin | A63F 13/10 463/5 |
| 2010/0069152 A1* | 3/2010 | Nishimura | A63F 13/10 463/31 |
| 2011/0057907 A1* | 3/2011 | Kim | G06F 3/042 345/175 |
| 2011/0102469 A1* | 5/2011 | Kami | A63F 13/837 345/682 |
| 2011/0169866 A1* | 7/2011 | Yoshikawa | A63F 13/10 345/660 |
| 2012/0309479 A1* | 12/2012 | Ojima | A63F 13/10 463/4 |
| 2013/0079138 A1* | 3/2013 | Mizuno | A63F 13/5372 463/36 |
| 2013/0288790 A1* | 10/2013 | Wang | A63F 13/06 463/31 |
| 2013/0316821 A1* | 11/2013 | Summons | A63F 13/02 463/31 |
| 2014/0243058 A1* | 8/2014 | Tsuchiya | A63F 13/837 463/2 |
| 2014/0274239 A1* | 9/2014 | Han | A63F 13/00 463/2 |
| 2014/0342788 A1* | 11/2014 | Kim | A63F 13/005 463/2 |
| 2015/0031421 A1* | 1/2015 | Jo | A63F 13/35 463/2 |

OTHER PUBLICATIONS

Bryan Mann-Lewis, An Intelligent Targeting System, http://people.scs.carleton.ca/~barbeau/Honours/Bryan_Mann_Lewis.pdf, Carleton University, School of Computer Science, COMP 4905—Honours Project, Aug. 14, 2009, 29 pages.

* cited by examiner

FIG. 6

SYSTEM AND METHOD FOR PLAYING VIDEO GAMES ON TOUCHSCREEN-BASED DEVICES

BACKGROUND OF THE INVENTION

The present invention relates generally to video games, and more particularly to systems and methods for playing video games on touchscreen-based devices.

Video games are enjoyed by many, often allowing video game players to virtually participate in otherwise unavailable activities, whether due to requirements of skill, experience, or equipment availability, or simply due to inherent dangers of the activities.

Many video games can be considered weapons-related games, in which gameplay includes aiming a weapon at a target. Examples include first-person shooters and third-person shooters, which may encompass combat simulation games, flight or vehicle simulation games, and other avatar-driven games. In the typical first-person shooter game, the player views the virtual environment from the perspective of the player's avatar (i.e., a first-person perspective). The first-person perspective is meant to immerse the player in the virtual environment and gives the player the feeling of performing the actions being carried out by the avatar (e.g., aiming a gun at a target, participating in a fighter jet dogfight, aiming a cannon at a target, etc.). A third-person shooter game may provide an "over the shoulder" view or side view of the actions of an avatar. Third-person shooter games may provide the player a more expansive view of the avatar's environment.

Weapons-related games have generally been played on video game consoles or personal computers using traditional input devices such as gamepads, joysticks, mice, and keyboards. The variety, accuracy, and precision of inputs on these traditional devices allow for a significant degree of control in weapons-related games. For example, in controlling an avatar in a first-person shooter environment, one set of inputs may be configured for "free look," which allows the player to aim and turn the player's view horizontally and vertically. Another set of buttons may be configured to trigger, use, or "fire" primary and secondary weapons. Various inputs may also be configured to command the avatar's movement (e.g., forwards, backwards, side-to-side strafing, turning left and right, crouching, jumping, sliding, leaning, etc.) and perform additional functions (e.g., picking up and dropping weapons, opening doors, controlling vehicles, etc.).

With the recent proliferation of touchscreen-based devices such as tablets, smartphones, portable media players, touch-enabled laptops, and PDAs, players are increasingly playing weapons-related games using a touchscreen as the primary input. This presents several challenges. For example, compared to traditional input devices, many players have not been able to achieve the same degree of precision and accuracy of control using a touchscreen. This problem is compounded by the fact that many players have spent numerous hours learning to play weapons-related games with traditional input devices and are disinclined to relearn playing using touchscreen inputs.

Attempts have been made at reducing available control mechanisms on touchscreen devices to allow for more fun and accessible gameplay. For example, some weapons-related games have reduced the number of moves and functions available to the player in order to simplify the user interface. Others restrict the player's ability to tilt the viewpoint upwards and downwards in an attempt to simplify the aiming process. Despite these changes, many players still perceive playing weapons-related games on a touchscreen device to be too difficult and cumbersome compared to using traditional input devices.

BRIEF SUMMARY OF THE INVENTION

One aspect of the invention provides a computer-implemented method useful in playing a video game on a touchscreen-based device, the method being implemented by a computer system that includes one or more processors, the method comprising: presenting a virtual environment from a first viewpoint; presenting a user interface to a player, the user interface including at least a plurality of graphical user input elements representative of different directions in the virtual environment; instantiating a plurality of targets in the virtual environment; assigning priorities to at least some of the plurality of targets; receiving an indication that one of the graphical user input elements representative of different directions in the virtual environment has been selected by a user; and in response to receiving the indication that the one of the graphical user input element has been selected by a user, determining a second viewpoint for viewing the virtual environment that is different from the first viewpoint for viewing the virtual environment, wherein the second viewpoint for viewing the virtual environment is determined relative to a highest-priority target in a direction corresponding to a direction of the selected graphical user input element.

Another aspect of the invention provides a computer-implemented method useful in playing a video game on a touchscreen-based device, the method being implemented by a computer system that includes one or more processors, the method comprising: presenting a virtual environment; presenting a user interface to a player, the user interface comprising a crosshair; instantiating at least one target; determining whether one of the at least one targets is within a predefined distance from the crosshair; and if one of the at least one targets is within a predefined distance from the crosshair, moving the crosshair onto the one of the at least one targets that is within a predefined distance from the crosshair; wherein moving the crosshair onto the one of the at least one targets that is within a predefined distance from the crosshair is done independently of the player's viewpoint.

Another aspect of the invention provides a computer-implemented method useful in playing a video game, comprising: presenting a representation of a virtual world and at least one user selectable input for switching targets, the virtual world including a plurality of targets; receiving an input signal indicative of selection of the at least one user selectable input for switching targets; determining a new target; presenting a further representation of the virtual world with an aiming indicator a predefined distance from the new target.

These and other aspects of the invention are more fully comprehended upon review of this disclosure.

DETAILED DESCRIPTION

The present invention relates to systems and methods for controlling a weapons-related video game on a touchscreen-based device. Aspects of the invention simplify the act of aiming at a target on a touchscreen-based device by: presenting a virtual environment from a first viewpoint; presenting a user interface to a player, the user interface including at least a plurality of graphical user input elements representative of different directions in the virtual environment; instantiating a plurality of targets in the virtual environment; assigning priorities to at least some of the plurality of targets; receiving an indication that one of the graphical user input elements representative of different directions in the virtual environment has been selected by a user; and in response to receiving the indication that the one of the graphical user input element has been selected by a user, determining a second viewpoint for viewing the virtual environment that is different from the first viewpoint for viewing the virtual environment, wherein the second viewpoint for viewing the virtual environment is determined relative to a highest-priority target in a direction corresponding to a direction of the selected graphical user input element.

Figure 1:
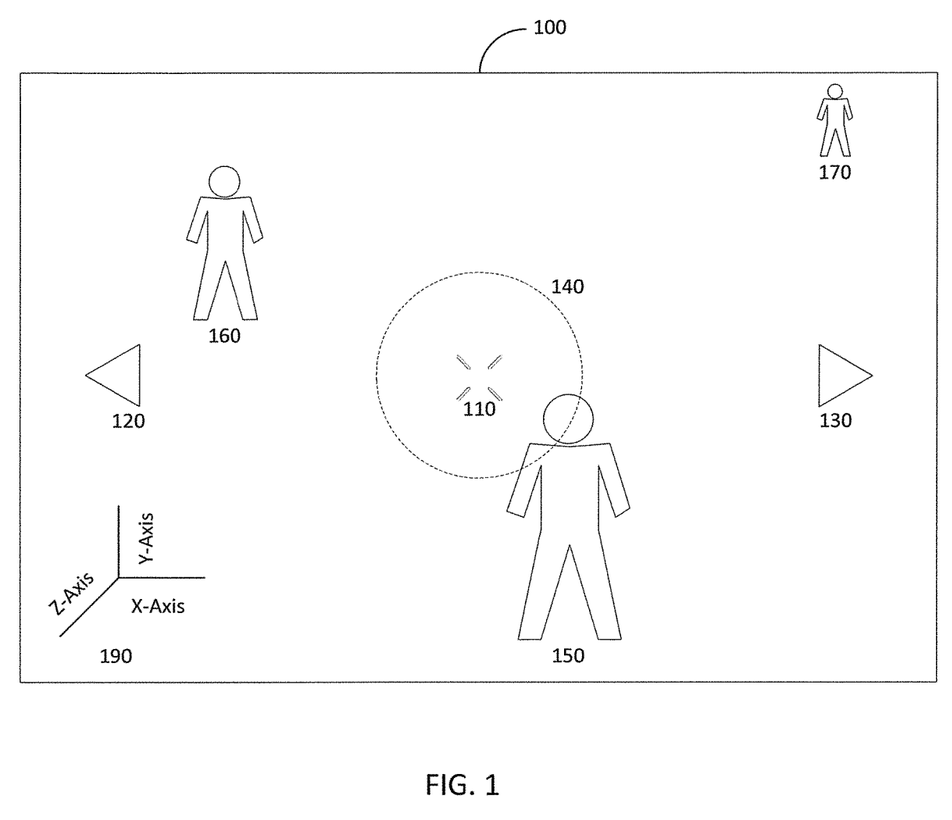
FIG. 1 is a diagram of a user interface in accordance with aspects of the invention.

FIG. 1 illustrates an exemplary screen of a user interface 100 for a weapons-related video game in accordance with aspects of the invention. User interface 100 is depicted in the context of a first-person shooter combat simulation, but the inventive aspects of user interface 100 may be applied in various embodiments to other video games that involve aiming at a target on a touchscreen-based device, including without limitation, first- and third-person weapons-related video games such as combat simulations and flight/vehicle simulators.

During gameplay, the weapons-related video game presents a virtual environment of gameplay, and may instantiate one or more targets, for example targets 150-170, in the virtual environment for the player to attack. In FIG. 1, targets 150-170 are visible to the player, however, in many cases, one or more of targets 150-170 may not be visible to the player (e.g., they are behind, to the side of, or otherwise blocked from the player's view). In FIG. 1, a z-axis extends away from the facing direction of the player's avatar (not shown in FIG. 1) or viewpoint towards the horizon, and the z-axis may be considered to vertically bisect the user interface 100. (Note that Cartesian axis 190 is included for reference only and in most embodiments would not be displayed in user interface 100.) Target 150 is the closest along the z-axis to the player's avatar (or viewpoint), followed by target 160 and target 170 in the distance. Targets whose center is to the right of the z-axis are considered to the right of the player's avatar (or viewpoint) (e.g., targets 150 and 170 in FIG. 1), and targets whose center is to the left of the z-axis are considered to the left of the player's avatar (or viewpoint) (e.g., target 160 in FIG. 1).

User interface 100 comprises a crosshair 110 that the player may use to aim his weapon at targets 150-170. Generally, the position of crosshair 110 relative to the targets when the player fires his weapon determines whether the player hits or misses any given target 150-170. In some embodiments, rays representing the trajectory of the fired shots are cast from the center of the screen, or in various embodiments some other point on the screen, for example a bottom center position, towards crosshair 110. If a ray intersects with a target 150-170, the target 150-170 is hit; otherwise, the target 150-170 is missed. In some embodiments, crosshair 110 is locked to the center of the screen. In other embodiments, crosshair 110 may be freely moved about the screen by the player. Although crosshair 110 is depicted in an "x" configuration, crosshair 110 may be of any configuration, including for example, a cross, a circle, a cross within a circle, etc. In some embodiments, there is no visible crosshair, and shots are simply fired to a predetermined location relative to the player's viewpoint (e.g., the center of the screen).

User interface 100 comprises two graphical user input elements herein referred to as snap-to-target buttons 120 and 130. As illustrated in FIG. 1, a left snap-to-target button 120 is about a left side of the screen, and may be considered pointing to the left, and a right snap-to-target button 130 is about a right side of the screen, and may be considered pointing to the right. The left snap-to-target button may be considered representative of a left direction and the right snap-to-target may be considered representative of a right direction. In various embodiments additional (or fewer) snap-to-target buttons representative of different directions may be available. In addition, in various embodiments the snap-to-target buttons may be variously positioned on the screen, and may be representative of different directions solely by their placement on the screen, solely by use of graphical or textual symbols indicating directions, or by other means. Snap-to-target buttons 120 and 130 assist the player in taking aim at the highest-priority target to the left and to the right of the player's avatar (or viewpoint). For example, when the player selects left snap-to-target button 120, the viewpoint pans to center crosshair 110 on the highest-priority target on the left of the player's avatar (or viewpoint). Similarly, when the player selects right snap-to-target button 130, the viewpoint pans to center crosshair 110 on the highest-priority target on the right of the player's avatar (or viewpoint).

In some embodiments, snap-to-target buttons 120 and 130 are configured to pan the viewpoint such that crosshair 110 is centered on the highest-priority target, in a direction indicated by or associated with the particular snap-to-target button, such that a shot fired by the player would hit that target. Alternatively or additionally, snap-to-buttons 120 and 130 may be configured to pan the viewpoint such that crosshair 110 is within a predetermined distance from the highest-priority target, but still require the player to take additional aim to hit the target. Such a configuration may be useful as it provides assistance to the player while still challenging the player to take aim at the target. In some embodiments, when the player selects a snap-to-target button 120 or 130, the gameplay may temporarily enter a slow-motion mode as the viewpoint pans to highest-priority target, with the virtual environment displayed on the screen panning in slow motion.

A target's priority may be based on a number of factors approximating the target's threat to the player or the target's danger level. For example, priority may be based on the one or more of: the target's proximity to the player's avatar (or viewpoint); the target's proximity to a line extending along the player's avatar's facing direction representing the avatar's line of sight (i.e., the z-axis); the total amount of damage inflicted by the target on the player; the amount of damage inflicted by the target on the player in a given amount of time (e.g., the last 3, 5, or 10 seconds); the amount of damage the target is capable of inflicting in a given shot and/or amount of time (e.g., the damage rate of the target's weapon); the target's health; etc.

Figure 2:
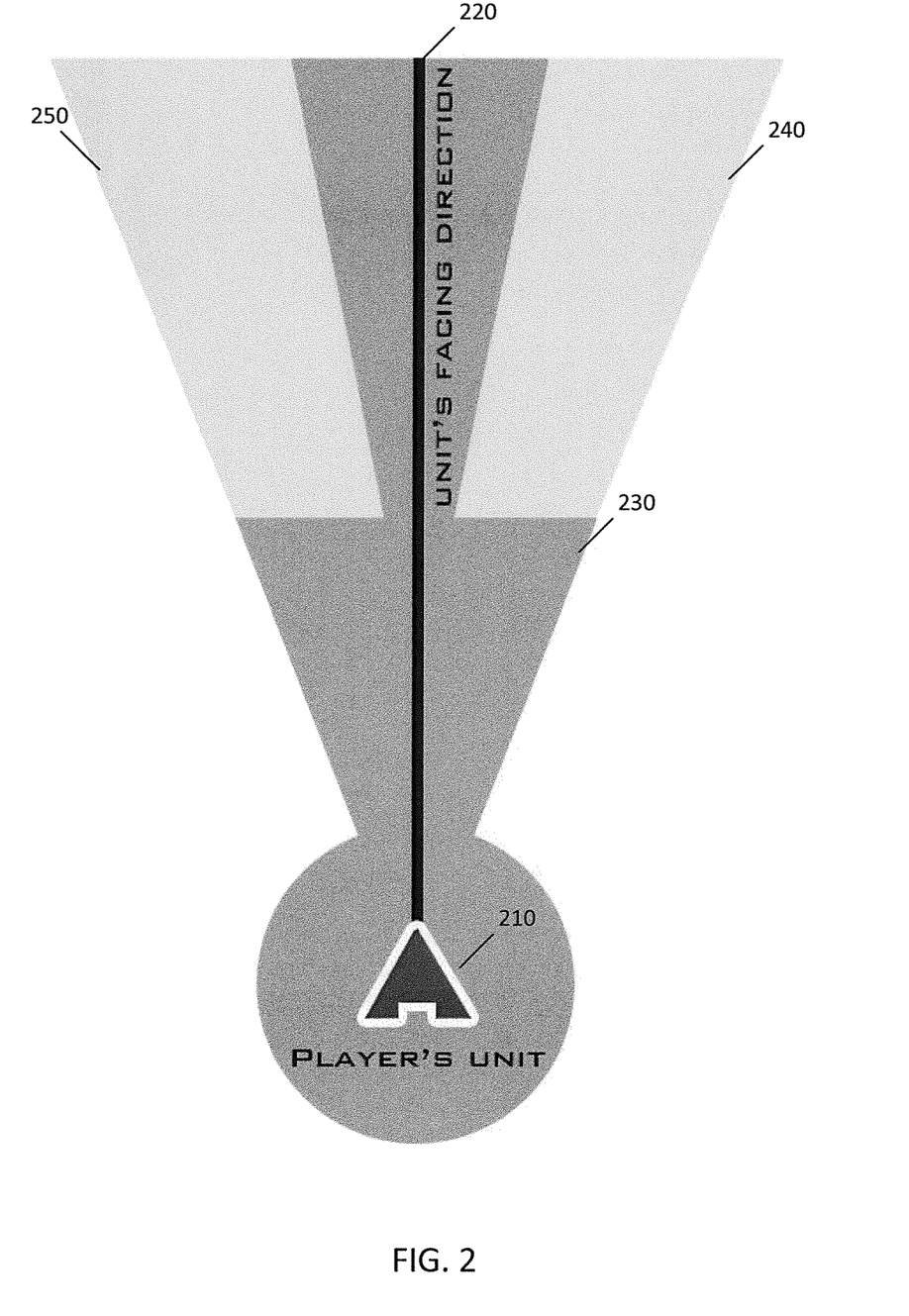
FIG. 2 is a diagram of a priority scheme in accordance with aspects of the invention.

FIG. 2 depicts an exemplary target prioritization scheme in accordance with aspects of the invention. In the embodiment of FIG. 2, the target's priority is based on a combination of the target's proximity to the player's avatar 210 (or viewpoint) and the target's proximity to the player's line of sight 220. FIG. 2 shows a high-priority region as an area within a predefined radius of a player's unit, for example the player's avatar, an area within 22.5 degrees of an axis defined by the avatar's line of sight (z-axis) and between the predefined radius and a more distant predefined point on the z-axis, and an area within approximately 10 degrees of the z-axis between the predefined point on the z-axis and an even more distant point on the z-axis. FIG. 2 also shows mid-priority regions 240 and 250 as areas outside the high-priority region between the more distant point and the even more distant point on the z-axis, but within 22.5 degrees of the z-axis. Generally, targets falling within high-priority region 230 have the highest-priority, targets within mid-priority regions 240 and 250 have the second highest priority, and targets outside regions 230, 240, and 250 are the lowest priority. Within each region, targets may be further prioritized based on their proximity to the player's avatar 210 and/or the avatar's facing direction 220.

Referring back to FIG. 1, in some embodiments, snap-to-target buttons 120 and 130 are configured to visually alert the player (for example, by flashing, changing color, made bold, etc.) when a target is within a predetermined range of the player's avatar (or viewpoint) or when a target exceeds a certain priority level. In some embodiments the visual alert provided by the snap-to-target buttons are on a directional basis, with only buttons for a particular direction providing visual alerts when there are targets in those directions fulfilling the criteria. In some embodiments, snap-to-target buttons 120 and 130 may be visually de-emphasized (for example, greyed out, made to appear translucent, removed altogether, etc.) if there are no targets within a predetermined range of the player's avatar (or viewpoint) or if there are no targets of a certain priority level.

In some embodiments, user interface 100 may further comprise a soft-lock area 140 centered around crosshair 100. Soft-lock area 140 further assists the player to take aim by automatically moving crosshair 100 onto targets within soft-lock area 140. For example, in FIG. 1, a portion of target 150 is within soft-lock area 140. If soft-lock is enabled, crosshair 110 would automatically center over some portion of target 150 that is within soft-lock area 140. In many embodiments, crosshair 110 would move independently of the player's viewpoint. Alternatively, movement of crosshair 110 may cause the player's viewpoint to move correspondingly.

Although soft-lock area 140 is depicted as a circular area in FIG. 1, the area may be of any shape or size depending on the degree of assistance desired. In addition, while FIG. 1 depicts a circle demarcating soft-lock area 140, in some embodiments, soft-lock area 140 is an "invisible," non-demarcated area.

Figure 3:
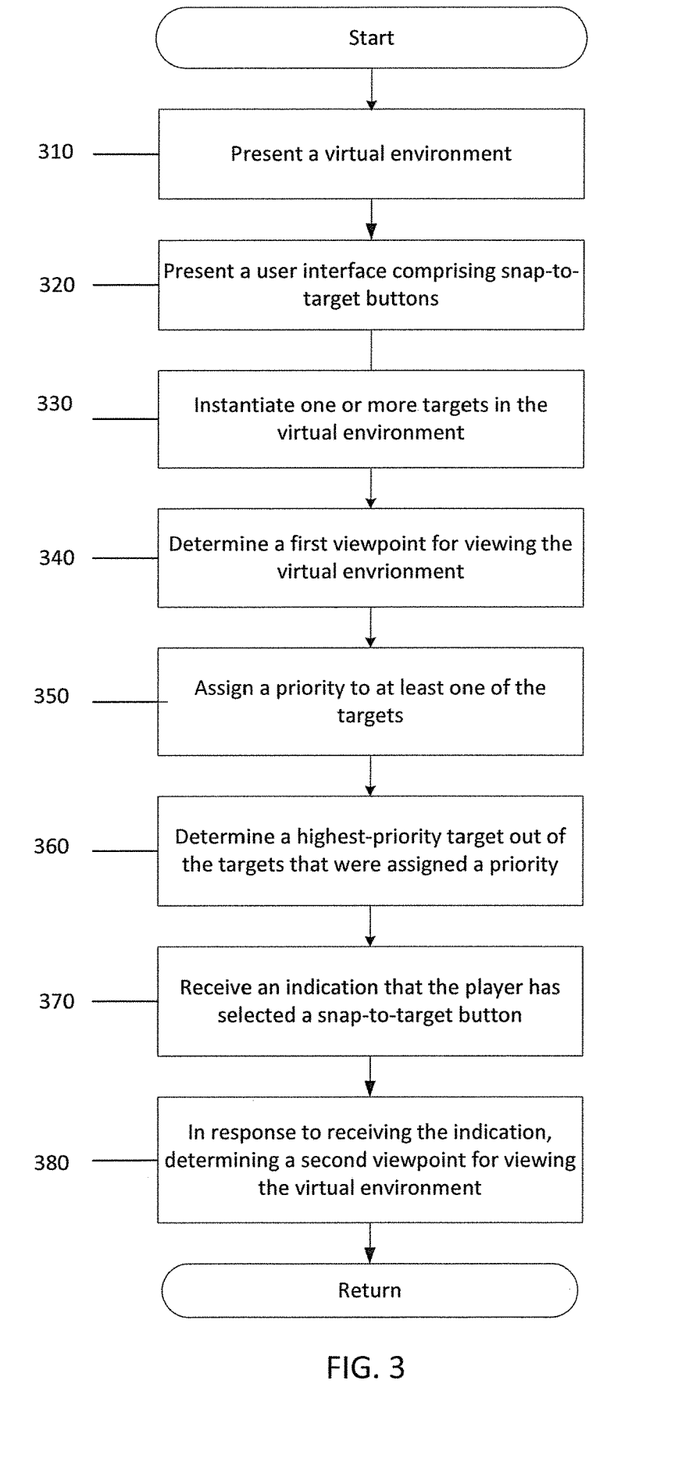
FIG. 3 is a flow chart of a process in accordance with aspects of the invention.

FIG. 3 is a flow chart of a process in accordance with aspects of the invention. The process may be performed, for example, by a video game system such as described in connection with FIG. 5, below.

In block 310, the process presents a virtual environment on a touchscreen-based device. In many embodiments, the virtual environment will be a level or world in which the weapons-related video game is played.

In block 320, the process presents a user interface to the user, the user interface comprising one or more graphical user input elements representing one or more snap-to-target buttons as discussed in FIGS. 1 and 2. In many embodiments, the user interface will comprise two snap-to-target buttons, which assist the player in taking aim at the highest-priority targets to the right and left of the player's avatar (or viewpoint). However, any number of snap-to-target buttons may be used. For example, a single snap-to-target button may be used to assist the player in taking aim at the highest-priority target to the player on any side of the player. Alternatively, additional snap-to-target buttons may be used to assist the player in taking aim at targets above and below the player.

In block 330, the process instantiates one or more targets in the virtual environment. In many embodiments, the targets may be enemy combatants in the weapons-related video game.

In block 340, the process determines a first viewpoint for viewing the virtual environment. The process then renders the virtual environment from the determined viewpoint. Depending on the type of game (e.g., first-person game, third-person game, side-scrolling game, etc.), the viewpoint may be determined relative to the player's avatar, the player's viewpoint, or some other virtual camera location.

In block 350, the process assigns a priority to at least one of the instantiated targets. As discussed above, a target's priority may be based on a number of factors approximating the target's threat to the player or the target's danger level. For example, a target's priority may be based on the one or more of: the target's proximity to the player's avatar (or viewpoint); the target's proximity to the player's avatar's facing direction (i.e., the z-axis); the total amount of damage inflicted by the target on the player; the amount of damage inflicted by the target on the player in a given amount of time (e.g., the last 3, 5, or 10 seconds); the amount of damage the target is capable of inflicting in a given shot and/or amount of time (e.g., the damage rate of the target's weapon); the target's health; etc. In some embodiments, the process may only assign priorities to a subset of the instantiated targets, for example, only those targets to the left or right of the player's avatar (or viewpoint), only those targets currently attacking the player, or only those targets currently visible to the player.

In block 360, the process determines a highest-priority target out of the targets that have been assigned a priority.

In block 370, the process receives an indication that the player has selected a snap-to-target button.

In block 380, in response to receiving the indication, the process determines a second viewpoint for viewing the virtual environment, the second viewpoint being determined relative to the highest-priority target, which in some embodiments is a highest priority target in a direction corresponding to a direction indicated by or corresponding to a direction associated with the selected snap-to-target button. For example, the viewpoint may pan to center the player's crosshair on the highest-priority target. In some embodiments, the second viewpoint may position the crosshair such that a shot fired would hit the highest-priority target. In some embodiments, the second viewpoint may position the crosshair within a predefined distance from the highest-priority target but such that a shot fired would still miss the highest-priority target. In some embodiments, gameplay may temporarily enter a slow-motion mode, which further assists the player in taking aim at the highest-priority target.

The process then returns.

Figure 4:
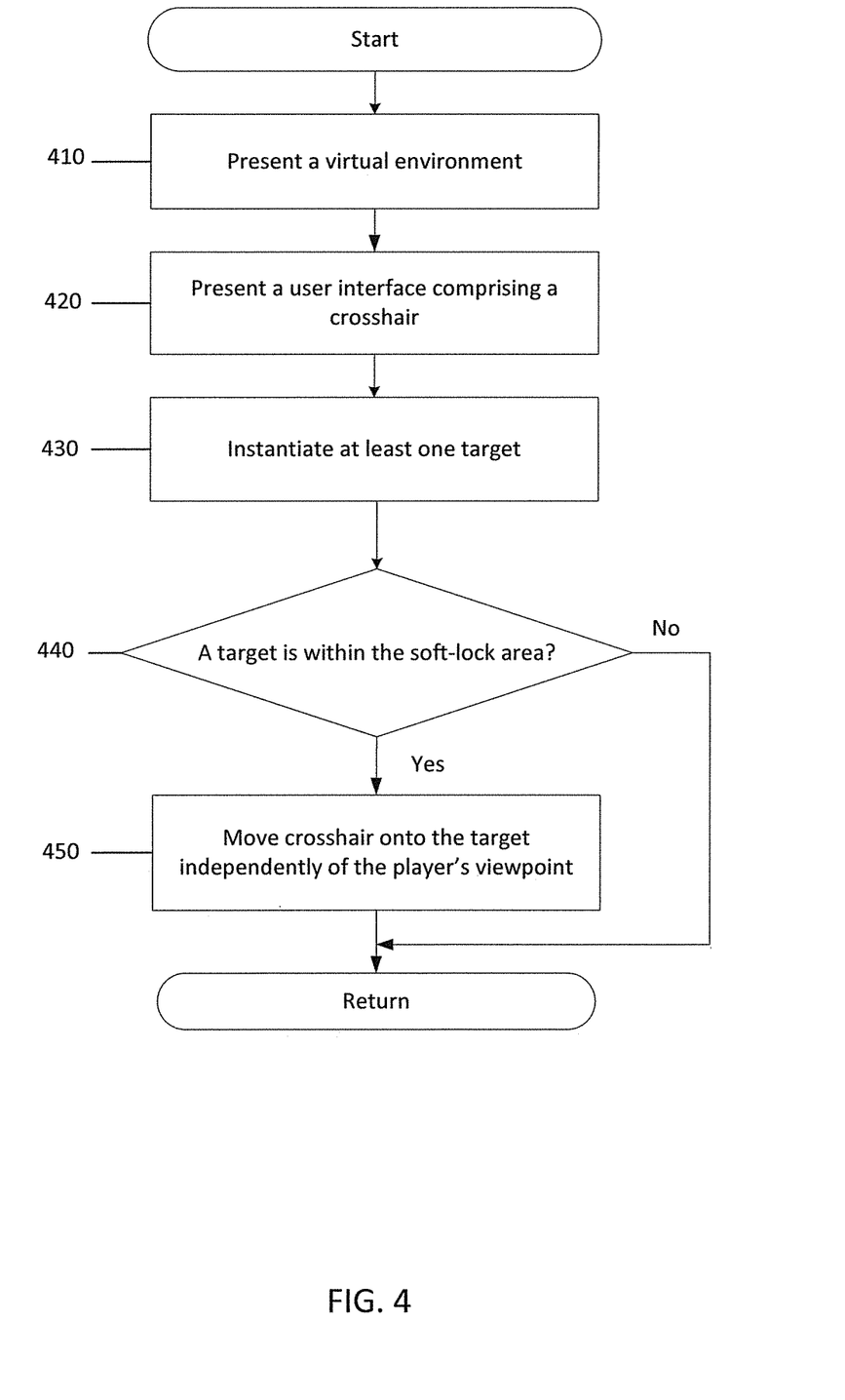
FIG. 4 is a further flow chart of a process in accordance with aspects of the invention.

FIG. 4 is a flow chart of a process in accordance with aspects of the invention. The process may be performed, for example, by a video game system as described in connection with FIG. 5, below.

In block 410, the process presents a virtual environment on a touchscreen-based device. In many embodiments, the virtual environment will be a level or world in which the weapons-related video game is played.

In block 420, the process presents a user interface comprising a crosshair. The user interface further comprising a predefined area around the crosshair (i.e., the soft-lock area) that may or may not be visible to the user. As discussed above in connection with FIG. 1, when a target is within soft-lock area, the crosshair is automatically moved onto a portion of the target within the soft-lock area. In some embodiments, the soft-lock area may be a circular area around the crosshair, but the soft-lock area may be of any shape or size depending on the degree of assistance desired.

In block 430, the process instantiates one or more targets in the virtual environment. In many embodiments, the targets may be enemy combatants in the weapons-related video game.

In block 440, the process determines whether a target is within the soft-lock area. If a target is within the soft-lock area, the process proceeds to block 450.

In block 450, the process moves the crosshair onto the target that is within the soft-lock area. In many embodiments, the process moves the crosshair independently of the player's viewpoint. Alternatively, the process may move the crosshair and the player's viewpoint in correspondence.

The process then returns.

Figure 5:
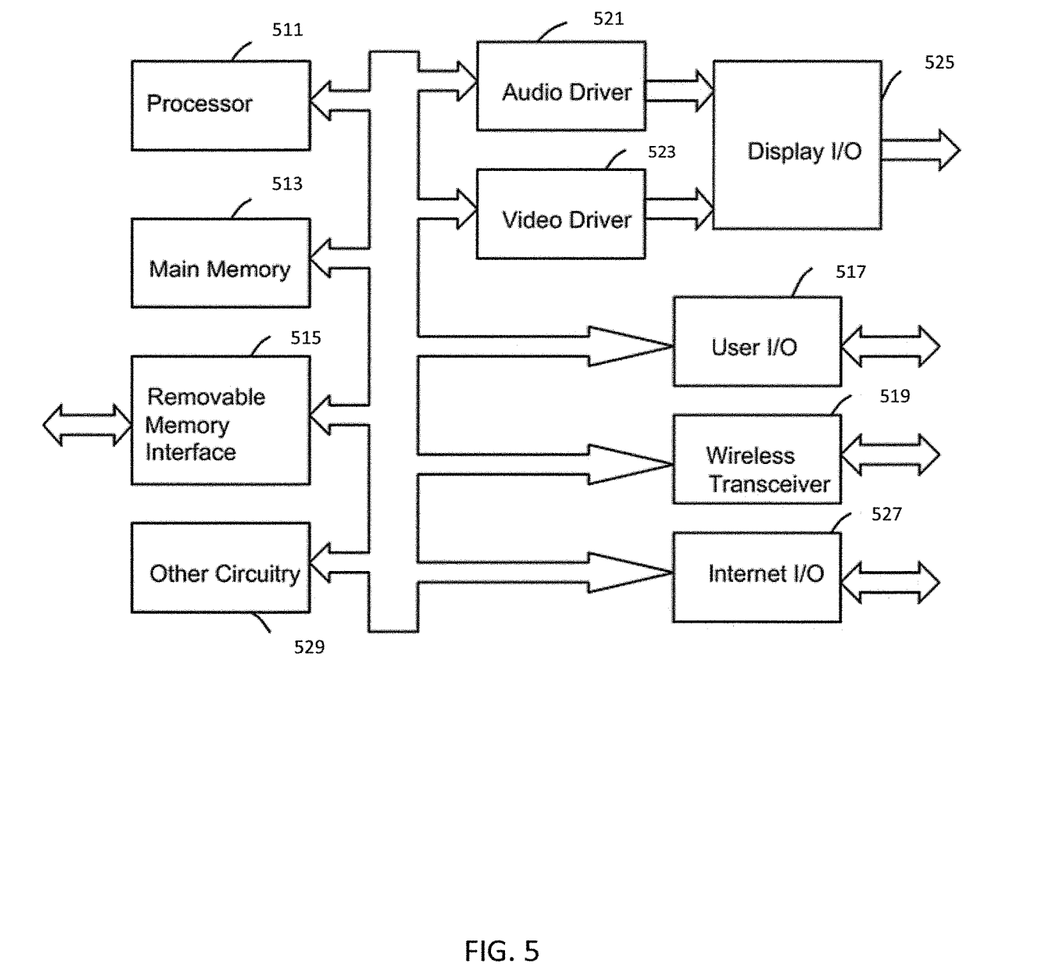
FIG. 5 is a diagram of a processor and related circuitry useful in accordance with aspects of the invention.

FIG. 5 is an example of a block diagram of a processor and associated circuitry useful in a touchscreen-based device in accordance with aspects of the invention. As shown in FIG. 5, a processor 511 is connected to other components via a bus. The other components include a main memory 513 and a removable memory interface 515, which may be coupled to a removable memory device, for example, a SD memory card. The processor may execute instructions retrieved from main memory and/or the removable memory device to control game play. For example, the instructions may be for determining possible movements, positions, and locations of the player's avatar and/or targets.

The processor is coupled to an audio driver 521 and a video driver 523. The audio driver produces sound signals and the video driver produces image signals. The sound signals and image signals are transmitted via a display I/O device 525. The display I/O device generally supplies the sound and image signals to a sound and display devices incorporated in the touchscreen-based device.

The processor may also be coupled to a user I/O device 517, a wireless transceiver 519, an Internet I/O device 527, and other circuitry 529. The user I/O device may receive signals from a touchscreen being used by the player and providing inputs, for example, during gameplay. The Internet I/O device provides a communication channel that may be used, for example, for multiple player games.

Figure 6:
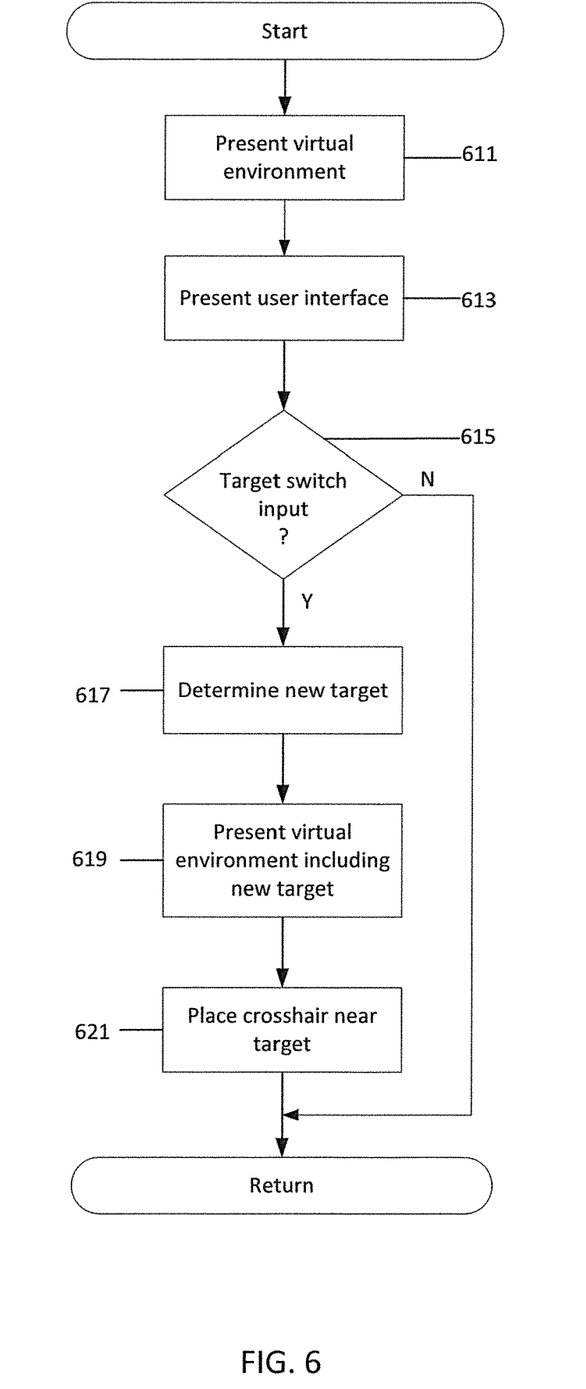
FIG. 6 is a still further flowchart of a process in accordance with aspects of the invention.

FIG. 6 is a flowchart of a further process in accordance with aspects of the invention. The process discussed with respect to FIG. 6 may be performed, for example, by a video game system as described in connection with FIG. 5.

In block 611 the process presents a virtual environment as part of video game play. The process may present the virtual environment, for example, on a display of a handheld device with a touchscreen, the handheld device providing a video game system. The virtual environment may present a view, from a particular viewpoint, of a virtual world that includes targets.

In block 613 the process presents a user interface. In various embodiments the presentation of the user interface may be accomplished before, during, or after the presentation of the virtual environment. The user interface includes at least one user selectable input for switching targets. In some embodiments the selectable input is associated with a particular direction in the virtual environment. In some embodiments the at least one selectable input is a plurality of user selectable inputs for switching targets, with each of the plurality of selectable inputs associated with a corresponding different direction.

In block 615 the process determines if a target switch request has been received. The target switch request is, in some embodiments, in the form of an input signal indicative of selection of one of the selectable inputs for switching targets. If a target switch request has been received, the process continues to block 617, otherwise the process returns.

In block 617 the process determines a new target. In some embodiments the new target is a target having a highest priority. In some embodiments the new target is a target having the highest priority, excluding any target currently having a status as a selected target. A selected target is, in some embodiments, a target previously identified as a new target or, in some embodiments, a target which is currently within a predefined range of an aiming indicator, for example a crosshair, in the video game virtual world. In various embodiments the new target is a target having a highest priority in a direction associated with the selected input for switching targets. For example, in some embodiments, the crosshair serving as an aiming indicator may be resident on a first target when a left direction target switch input is received, and the process selects a highest priority target to the left of the crosshair as the new target.

In block 619 the process presents the virtual environment including display of the new target. In some embodiments the process pans from a current view of the virtual world from the viewpoint to a new view from the viewpoint. In some embodiments the new view is centered about the new target, in some embodiments the new view includes the new target, but the new target is not centered in the new view.

In block 621 the process places an aiming indicator near, but not on, the new target. In some embodiments the operations of block 621 occurs as part of the operations of block 619, in other embodiments the operations of block 621 occur before or after the operations of block 619. In some embodiments the aiming indicator is placed a predefined distance away from the new target. In some embodiments the distance is a distance such that a discharge from a weapon aimed at the aiming indicator would not hit the new target. In some embodiments the aiming indicator is placed a predefined distance and at a predefined direction from the new target. In some embodiments the predefined direction is based on the direction associated with the selected target switch input.

The process thereafter returns.

Although the invention has been discussed with respect to various embodiments, it should be recognized that the invention comprises the novel and non-obvious claims supported by this disclosure. Furthermore, all or portions of the subject innovation can be implemented as a system, method, apparatus, or article of manufacture using standard programming and/or engineering techniques to produce software, firmware, hardware or any combination thereof to control a computer to implement the disclosed innovation.

What is claimed is:

1. A computer-implemented method useful in playing a video game, comprising:

presenting, on a screen of a touchscreen-based device, a representation of a virtual world and a user interface including at least one user selectable graphical input for switching targets, the virtual world including a plurality of targets, each of the plurality of targets having a priority, the priority of each particular one of the plurality of targets being based upon a threat of the particular target to the user in the video game;

receiving, by a processor of the touchscreen-based device, an input signal indicative of selection of the at least one user selectable graphical input for switching targets; and in response to receiving of the input signal indicative of selection of the at least one user selectable graphical input for switching targets:

determining, by a processor of the touchscreen-based device, a new target from the plurality of targets based on the priority of each of the plurality of targets, and presenting, on the screen, a further representation of the virtual world, with an aiming indicator a predefined distance away from the new target, such that the aiming indicator is near, but not on, the new target, such that a shot fired would miss the new target, with the user having to take additional aim to have a shot fired hit the new target, and wherein the new target is not centered in the further representation of the virtual world.

2. The method of claim 1, wherein the at least one user selectable graphical input comprises a plurality of user selectable graphical inputs, each of the plurality of user selectable graphical inputs associated with a corresponding different direction, and the input signal indicative of selection of the at least one user selectable graphical input for switching targets is an input signal indicate of selection of a first of the plurality of user selectable graphical inputs.

3. The method of claim 2, wherein determining a new target comprises determining a highest priority target in a direction associated with the first of the plurality of user selectable graphical inputs.

4. The method of claim 1 wherein the threat of the particular target to the user in the video game is determined based upon at least one of a total amount of damage inflicted by the particular target on the user; an amount of damage inflicted by the particular target on the user in a given amount of time; an amount of damage the particular target is capable of inflicting in a given shot, and an amount of damage the particular target is capable of inflicting in a particular amount of time, and a health status of the particular target.

5. The method of claim 1, wherein the threat of the particular target to the user in the video game is determined based upon a total amount of damage inflicted by the particular target on the user.

6. The method of claim 1, wherein the threat of the particular target to the user in the video game is determined based upon an amount of damage inflicted by the particular target on the user in a given amount of time.

7. The method of claim 1, wherein the threat of the particular target to the user in the video game is determined based upon an amount of damage the particular target is capable of inflicting in a given shot.

8. The method of claim 1, wherein the threat of the particular target to the user in the video game is determined based upon an amount of damage the particular target is capable of inflicting in a particular amount of time.

9. The method of claim 1, wherein the threat of the particular target to the user in the video game is determined based upon a health status of the particular target.

* * * * *